(12) United States Patent
Oukili et al.

(10) Patent No.: US 10,732,311 B2
(45) Date of Patent: Aug. 4, 2020

(54) METHOD FOR ADJUSTING ATTRIBUTES OF MARINE SEISMIC SURVEY DATA

(71) Applicant: PGS Geophysical AS, Oslo (NO)

(72) Inventors: Julien Oukili, Oslo (NO); Didier Lecerf, Guilford (GB); Darryl James Anderson, Oslo (NO)

(73) Assignee: PGS Geophysical AS, Oslo (NO)

( * ) Notice: Subject to any disclaimer, the term of this patent is extended or adjusted under 35 U.S.C. 154(b) by 178 days.

(21) Appl. No.: 15/787,242

(22) Filed: Oct. 18, 2017

(65) Prior Publication Data

US 2018/0106920 A1    Apr. 19, 2018

Related U.S. Application Data

(60) Provisional application No. 62/409,946, filed on Oct. 19, 2016.

(51) Int. Cl.
| | |
|---|---|
| *G01V 1/38* | (2006.01) |
| *G01V 1/36* | (2006.01) |
| *G01V 1/30* | (2006.01) |

(52) U.S. Cl.
CPC .............. *G01V 1/364* (2013.01); *G01V 1/308* (2013.01); *G01V 1/38* (2013.01); *G01V 2210/324* (2013.01); *G01V 2210/51* (2013.01)

(58) Field of Classification Search
CPC .......... G01V 1/364; G01V 1/38; G01V 1/308; G01V 2210/51; G01V 2210/324
See application file for complete search history.

(56) References Cited

U.S. PATENT DOCUMENTS

| | | | |
|---|---|---|---|
| 6,049,759 A | 4/2000 | Etgen | |
| 6,775,618 B1 | 8/2004 | Robertsson et al. | |
| 6,832,160 B2 | 12/2004 | Vinje | |
| 6,889,142 B2 | 5/2005 | Schonewille | |
| 6,917,564 B2 | 7/2005 | Leaney | |
| 7,065,004 B2 | 6/2006 | Jiao et al. | |
| 7,450,469 B2 | 11/2008 | Moore | |
| 7,609,585 B2 | 10/2009 | Jiao | |
| 8,120,991 B2 | 2/2012 | Koren | |
| 8,121,791 B2 | 2/2012 | Lazaratos et al. | |
| 8,203,907 B2 | 6/2012 | Krebs et al. | |

(Continued)

FOREIGN PATENT DOCUMENTS

WO    2016097859 A1    6/2016

OTHER PUBLICATIONS

Long et al., No-Compromise Marine Seismic: A Full-Azimuth Survey Design for Total-Wavefield Velocity Model Building and Imaging in the Deep-Water Gulf of Mexico, 2014, SEG Denver 2014 Annual Meeting, pp. 52-55 (Year: 2014).*

(Continued)

*Primary Examiner* — Toan M Le

(57) ABSTRACT

Techniques are disclosed relating to reducing noise in marine seismic survey data. A shot-by-shot depth migration of recorded marine seismic survey data that includes multiples wavefields indicative of surface reflections may be performed. Post-migration data generated by the migration may include angle information derived from the multiples wavefields. Attributes of the marine seismic survey data may be corrected using the angle information in order to identify a potential sub-surface structure.

29 Claims, 15 Drawing Sheets

(56) References Cited

U.S. PATENT DOCUMENTS

| | | |
|---|---|---|
| 8,239,135 B2 | 8/2012 | Day et al. |
| 8,289,809 B2 | 10/2012 | Winbow |
| 8,379,482 B1 | 2/2013 | Khare et al. |
| 8,478,531 B2 | 7/2013 | Aaron et al. |
| 8,830,788 B2 | 9/2014 | Xia et al. |
| 9,250,341 B2 | 2/2016 | Tang et al. |
| 9,310,500 B2 | 4/2016 | Kacewicz |
| 9,366,771 B2 | 6/2016 | Dasgupta et al. |
| 2009/0257308 A1 | 10/2009 | Bevc et al. |
| 2011/0075516 A1* | 3/2011 | Xia ................ G01V 1/303 |
| | | 367/53 |
| 2014/0288839 A1 | 9/2014 | Soubaras |
| 2016/0377755 A1 | 12/2016 | Theodore et al. |
| 2017/0038490 A1 | 2/2017 | Hu |

OTHER PUBLICATIONS

C. Lacombe, et al., "Correction for Water Velocity Variations and Tidal Statics," P098 EAGE 68th Conference & Exhibition—Vienna, Austria, Jun. 12-15, 2006, 5 pages.

Xiao-Bi Xie, et al., "Extracting angle domain information from migrated wavefield," Institute of Geophysics and Planetary Physics, SEG Int'l Exposition and 72nd Annual Meeting, Oct. 6-11, 2002, 4 pages.

C. Lacombe, et al., "Improvements in 4D Seismic Processing—Foinaven 4 Years on," G034 73rd EAGE Conference & Exhibition incorporating SPE EUROPEC 2011—Vienna, Austria, May 23-26, 2011, 5 pages.

S. MacKay, et al., "The impact of water-velocity variations on deepwater seismic data," The Leading Edge, Apr. 2003, pp. 344-350.

* cited by examiner

METHOD FOR ADJUSTING ATTRIBUTES OF MARINE SEISMIC SURVEY DATA

This application claims benefit of priority of U.S. Provisional Appl. No. 62/409,946, filed Oct. 19, 2016, which is hereby incorporated by reference in its entirety.

BACKGROUND

Description of the Related Art

Marine seismic surveying is a technique for investigating geological features underneath bodies of water using acoustic energy imparted into a body of water. The acoustic energy is reflected from boundaries with different acoustic impedances located under the body of water. For example, the acoustic energy may be reflected from different layers of sub-surface rock under the body of water. Sensors convert the reflected acoustic energy, which may be processed to identify potential sub-surface structures that may aid in the identification of hydrocarbons.

Various configurations of vessels, seismic sensors, and seismic sources may be employed to gather marine seismic survey data. Depending on particular physical conditions, such as, e.g., water depth at a survey location, different numbers and types of seismic sources and sensors may be employed. In some cases, such seismic sources and sensors may be towed behind a vessel on the surface of the body of water and used to gather the seismic survey data. In other cases, seismic sensors may be placed at the bottom of the body of water.

The vessel towing the sensors may include recording and storage devices to store the seismic survey data captured by the seismic sensors. Upon completion of a survey, a computing system may be employed to process the stored seismic survey data to identify potential sub-surface structures.

Figure 1:
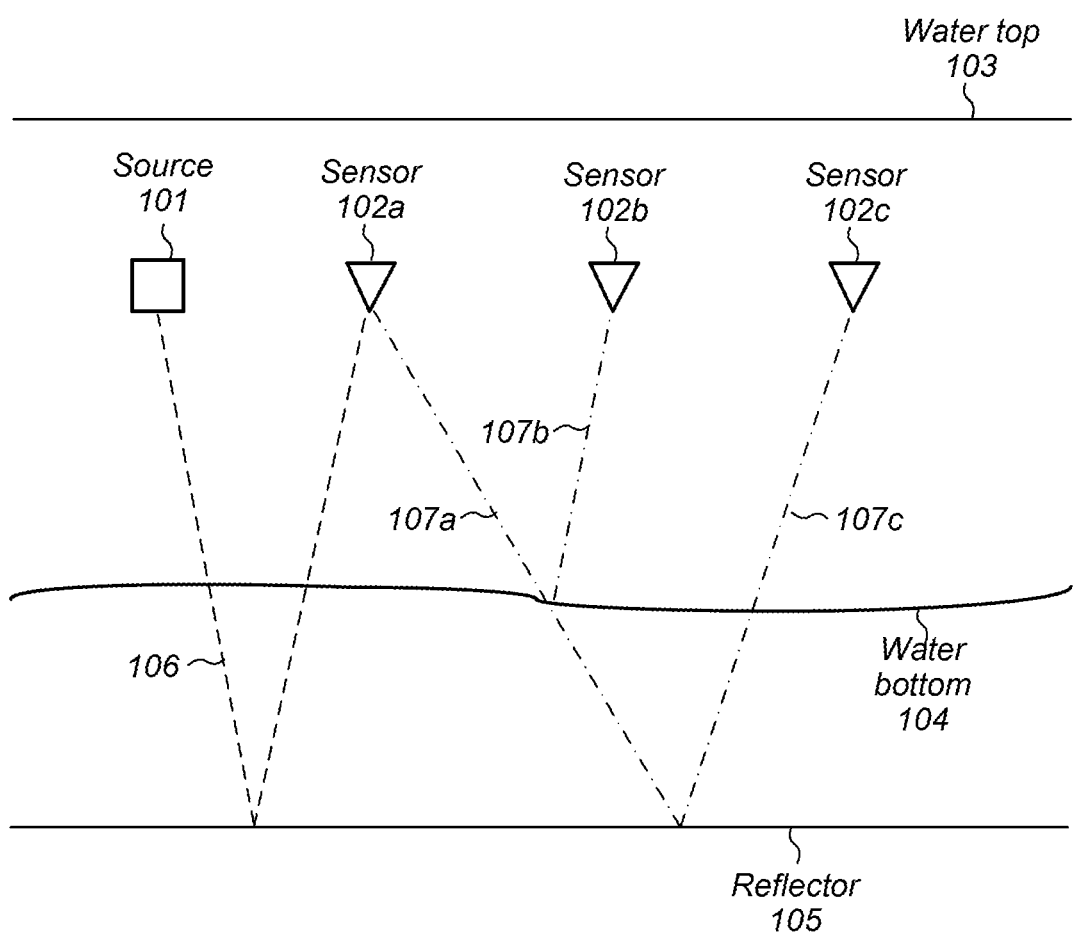
FIG. 1 is a diagram illustrating propagation of acoustic energy as part of conducting marine seismic surveys, according to some embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Marine seismic surveys are used to identify potential sub-surface structures that may be indicative of oil and/or natural gas deposits. During such surveys, acoustic energy is transmitted through the water and reflections from sub-surface structures are detected and recorded by one or more sensors. Between each shot of a particular survey or between different surveys, physical conditions associated with the surveyed area may change, resulting in noise between data sets. Such noise can reduce image resolution and may decrease the accuracy of identifying potential sub-surface structures. The embodiments illustrated in the drawings and described herein may decrease noise in marine seismic survey data, thereby improving image quality and accuracy of identification of potential sub-surface structures.

A diagram depicting primary and multiples wavefields (or simply "multiples") in a marine setting is illustrated in FIG. 1. In the illustrated embodiment, source 101 is positioned along water top 103 along with sensors 102a-c. In various embodiments, source 101 may include an air gun, marine vibrator, or any other suitable acoustic energy source. Sensors 102a-c may include hydrophones, geophones or any other suitable sensor configured to detect acoustic energy.

Path 106 is an example of a primary wavefield starting from source 101 on water top 103. The primary wavefield is the result of acoustic energy supplied by source 101 as part of a single shot, and travels from source 101, past water bottom 104 until reflected by reflector 105, at which point it returns toward water top 103. The energy reflected from reflector 105 may be detected by sensor 102a. In various embodiments, reflector 105 may correspond to a sub-surface structure, such as a boundary of a deposit of hydrocarbons (e.g., oil or gas), a boundary between sub-surface layers having different geological characteristics, or other types of sub-surface structure. Although not specifically illustrated in FIG. 1, water bottom 104 may also reflect acoustic energy.

While some of the acoustic energy traveling along path 106 is detected by sensor 102a, some of the acoustic energy is reflected by water top 103 back towards water bottom 104 along path 107a. Water bottom 104 and reflector 105 may reflect the reflected acoustic energy back towards water top 103 generating multiples wavefields along paths 107b and 107c. The acoustic energy traveling along paths 107b and 107c may be detected by sensors 102b and 102c. Using the distance between sensors, as well as other information about the water through which the acoustic energy is being transmitted, angles between an incident wavefield and a reflected wavefield may be determined to aid in the identification of potential sub-surface structures.

In many conventional approaches, multiples wavefields are regarded as noise, and geophysicists often attempt to filter multiples wavefields or otherwise suppress multiples in order to operate only on the primary wavefield. It is possible, however, to extract useful information from the multiples wavefields, and as described below in more detail, information indicative of both the primary wavefield and the multiples wavefields may be used in the identification of possible substructure. Such information may, in various embodiments, include elapsed time from when source 101 applies acoustic energy to when reflected acoustic energy is received by sensors 102a-c. Although a single set of multiples is depicted in the diagram of FIG. 1, in other embodiments, any suitable number of multiples may occur. Moreover, other embodiments, may include a different number of sensors than the number depicted in the diagram of FIG. 1.

It is noted that the relative spacing and angles between the wavefield paths depicted in the diagram of FIG. 1 are merely an example. In other embodiments, different relative spacing between sensors, and different relative angles between the wavefield paths are possible.

During a marine seismic survey when a particular shot is performed, the propagation of the acoustic energy from the source, as well as other wave fronts, may be affected by various physical parameters associated with the water. For example, the acoustic velocity of water and/or direction of a current flowing in the water can affect the path of a wavefield. Such physical parameters may vary from shot to shot within a particular sailline, resulting in differences in the recorded data for the individual shots. In some cases, a marine seismic survey may be performed over a period of days, weeks, etc., which may also result in differences in the data due to changes in the physical conditions.

In order to identify potential sub-surface structures, it is desirable to account for the differences between different data sets included in a survey or across different surveys, resulting from changes in physical conditions that may affect the transmission of the acoustic energy. This may be accomplished by migrating the seismic data to obtain angular information represented by the primary and multiples wavefields (e.g., represented in an angle domain), and using the incidence angle information resulting from the migration to update one or more attributes associated with the seismic data, for example, based on a model indicative of the behavior of the attribute(s). As used and described herein, an attribute is information indicative of one or more physical parameters of a transmission medium associated with the propagation characteristics of acoustic energy through the transmission medium. For example, attributes may include a sub-surface layer property. In some embodiments, the sub-surface layer property may include a water layer property, that may include one or more of a water velocity, a tidal static, a shot static, a static or velocity variation along a sail line, or any suitable combination. In some cases, there may be attributes associated with the pre-migration data, as well as the post-migration data.

Figure 2:
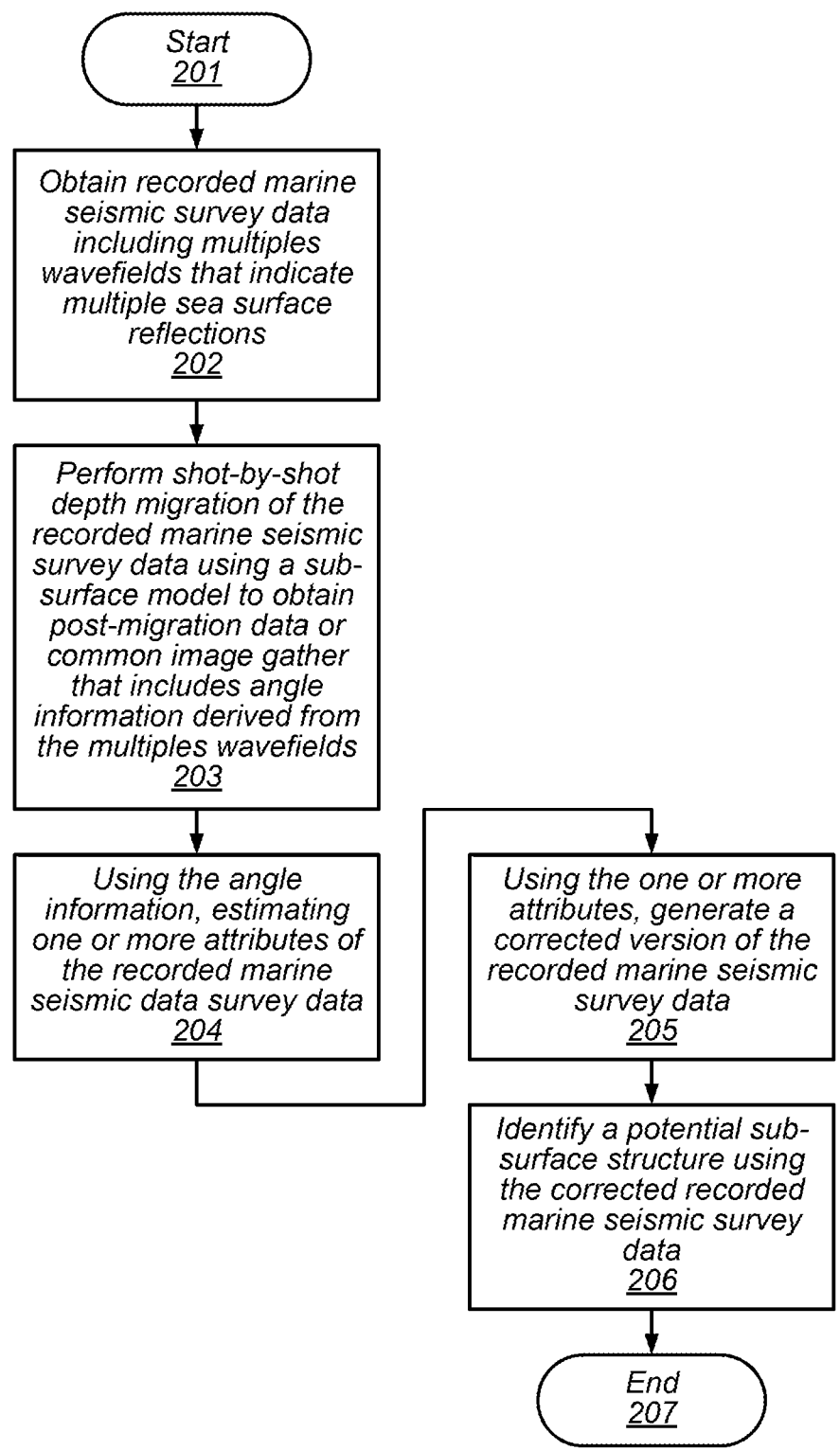
FIG. 2 is a flow diagram illustrating an embodiment of a method for identifying potential substructures using data gathered from marine seismic surveys, according to some embodiments.

By updating the attributes associated with the seismic data, such as, e.g., kinematics correction due to water velocity variation, improved imaging results for identifying potential sub-surface structures may be realized, in some embodiments. Moreover, by using the angle information available in multiples wavefields, more accurate estimates of the attributes may be accomplished, thus resulting in higher resulting image quality (e.g., reduced noise and/or a more accurate representation of sub-surface features) relative to conventional approaches in which multiples wavefields are filtered or suppressed. A flow diagram depicting an embodiment of a method for updating marine seismic survey data is illustrated in FIG. 2. The method begins in block 201.

Recorded marine seismic survey data that includes multiples wavefields that indicate multiple sea surface reflections may then be obtained (block 202). In various embodiments, the marine seismic survey data may include numerous shots and may be gathered over different periods, phases, and the like, using acoustic energy sources and sensors. The data may include information indicative of a primary wavefield along with one or more multiples wavefields. In some embodiments, the data may be gathered using both pressure sensors (e.g., hydrophones) and particle motion sensors (e.g., accelerometers and/or geophones); that is, the wavefield may be represented by measurement records of both pressure and particle motion sensors. In other embodiments, only records of pressure sensors may be used to obtain the wavefield data. Once the data has been gathered, it may be recorded or stored on one or more storage devices included in a computing system.

It is noted that in some embodiments, the recorded marine seismic survey data are obtained from different surveys, which may include numerous vintages of a 4D time-lapse survey of a given region, or may include partially overlapping 3D surveys that include various azimuth or wide azimuth surveys.

A shot-by-shot migration of the recorded marine seismic survey data may then be performed using a sub-surface model to obtain post-migration data (or common image gather) that includes angle information derived from the multiples wavefields (block 203). The term "common image gather" is used herein consistently with its ordinary meaning in this technical field, and refers to a set of seismic traces that share a common image point (i.e., traces that reflect off of the same or approximately the same point). In some embodiments, the shot-by-shot migration may be performed on the primary wavefields in addition to the multiples wavefields, and the post-migration data may include angle information derived from the primary wavefields and the multiples wavefields.

Using the angle information, one or more attributes of the recorded marine seismic survey data may then be estimated (block 204). For example, in some cases, an attribute associated with a water layer may be updated using the angle information. More particularly, when estimating attributes associated with the water layer, such as water velocity, in some embodiments the migration of block 203 may be performed using a reference water layer property model, such as a reference velocity model. Estimating of attributes may include performing residual moveout (RMO) analysis and generating one updated water layer property (e.g., velocity) per shot or per sailline. Estimating of attributes may also include correction for sailline variations in a sub-surface layer property, such as changes in a water layer property, e.g., performing a normal moveout (NMO) wraparound with a target fixed water velocity in the water layer. In the case wherein the recorded marine seismic survey data include multiple different surveys, estimating the one or more attributes may include reducing misalignment of corresponding data points within the different surveys.

Using the one or more attributes, the recorded marine seismic survey data may be corrected (block 205). In various embodiments, pre-migrated data may be corrected, which as noted in greater detail below with respect to FIG. 4, may require re-migration of the data following the correction, whereas in other cases (e.g., when the update occurs in the post-migration or image domain), no re-migration may be needed.

Using the corrected recorded marine seismic survey data, a potential sub-surface structure may be identified (block 206). In various cases, sub-surface structures may include particular geological structure that may indicate the presence of hydrocarbons or other sub-surface deposits, or features that may be hazardous when attempting to position a drilling rig, and the like. In some embodiments, the sub-surface model may be iteratively updated dependent upon the corrected recorded marine seismic survey data until the updated sub-surface model satisfies a convergence criterion. The method may conclude in block 207. By analyzing data in such a fashion, noise in the recorded marine seismic survey data may be reduced, thereby improving accuracy in detecting potential sub-surface structures.

It is noted that the embodiment of the method illustrated in FIG. 2 is merely an example. In other embodiments, different operations and different orders or operations are possible and contemplated.

The embodiment of the method depicted in FIG. 2 relies upon migrating data. As used and described herein, migrating data refers to translating seismic survey data from one domain to another domain.

Such migrations may be performed on individual shots included in marine seismic survey data. Such data may include both primaries and multiples. In some embodiments, the data for a particular shot may be analyzed, and noise removed prior to performing a migration. Performing such migrations may, in various embodiments, assist in the identification of possible sub-surface structures.

Figure 3:
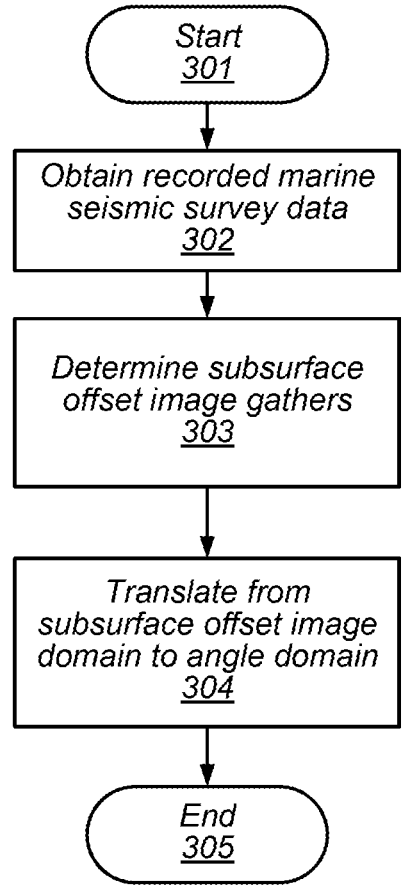
FIG. 3 is a flow diagram illustrating an embodiment of a method for migrating data gathered from marine seismic surveys, according to some embodiments.

Turning to FIG. 3, a flow diagram depicting an embodiment of a method for migrating recorded marine seismic survey data is illustrated. In various embodiments, the embodiment of the method depicted in FIG. 3 may correspond to block 203 of the embodiment illustrated in FIG. 2. The method begins in block 301.

Recorded marine seismic survey data may then be obtained (block 302). As described above, the marine seismic survey data may include numerous shots and may be gathered at different periods of time using acoustic energy sources and sensors. The data may include information indicative of a primary wavefield along with one or more multiples wavefields.

Sub-surface offset image gathers may then be determined (block 303). In various embodiments, the sub-surface offset image gathers may be based in part on the sub-surface coordinates and the half sensor-receiver offset. The image gathers may be calculated using any one of various algorithms. For example, in some embodiments the sub-surface offset image gathers may be determined by cross-correlating source and receiver wavefields in the time domain. Alternatively, the sub-surface offset image gathers may be determined by cross-correlating the source and receiver wavefields in the frequency domain. In other embodiments, a de-convolution method in the frequency domain may be employed.

In some embodiments, a translation from the sub-surface offset image domain to an angle domain may be performed (block 304). In various embodiments, the translation may include converting the dependency on the half sensor-receiver offset to a dependency on polar and azimuth angles of a spherical coordinate system. The method may then conclude in block 305. Although the above-referenced optional operation depicts a conversion to an angle domain, in other embodiments, a transformation to any other suitable domain may be employed.

It is contemplated that FIG. 3 illustrates an embodiment of a means for performing shot-by-shot depth migration. It is noted that the embodiment of the method depicted in FIG. 3 is merely an example. In other embodiments, different operations and different orders of operations are possible and contemplated.

Figure 4:
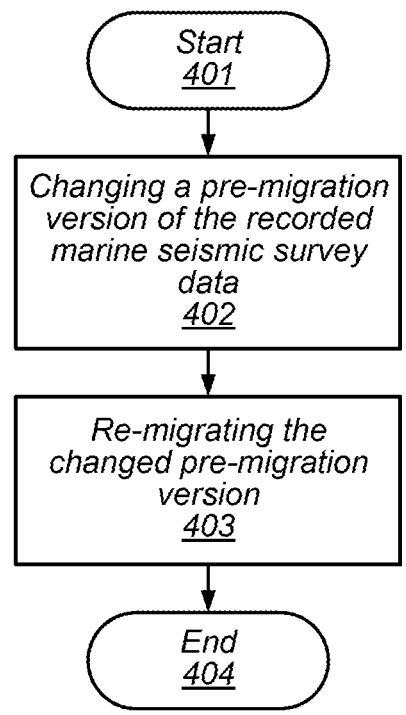
FIG. 4 is a flow diagram illustrating an embodiment of a method for updating attributes associated with data gathered from marine seismic surveys, according to some embodiments.

As previously mentioned, both the pre-migration seismic data and the post-migration marine seismic survey data may have associated attributes. In some cases, the same attributes may be associated with each type, i.e., pre-migration and post-migration, marine seismic survey data. Alternatively, the attributes may be different between the two types of marine seismic survey data. An embodiment of a method for updating pre-migration marine seismic survey data is depicted in the flow diagram of FIG. 4. It is contemplated that FIG. 4 illustrates one embodiment of a means for estimating one or more attributes of recorded marine seismic survey data.

The method begins in block 401. In various embodiments, the method depicted in the flow diagram of FIG. 4 may correspond to block 204 of the flow diagram of FIG. 2. A pre-migration version of the recorded marine seismic survey data may then be changed (block 402). During the changing, attributes associated with the pre-migration version of the recorded marine seismic survey data may be updated based on angle information included in post-migration version of the recorded marine seismic survey data generated by transforming the pre-migration version of the recorded marine seismic survey data.

Once the pre-migration version of the recorded marine seismic survey data has been changed, the pre-migration version may then be re-migrated (block 403). In various embodiments, upon completion of the re-migration, the newly migrated marine seismic survey data may be used to identify potential sub-surface structures as described above in regard to FIG. 2. The method may then conclude in block 404.

Figure 5:
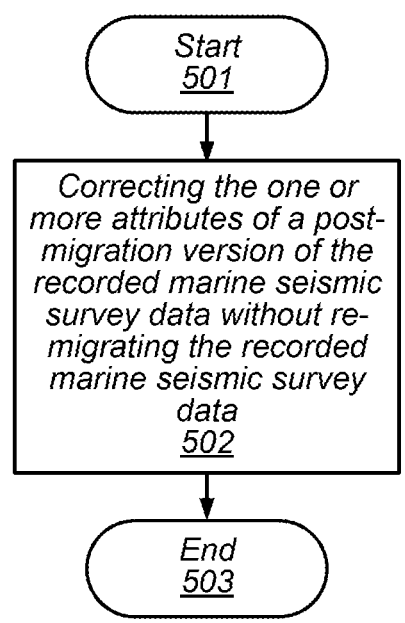
FIG. 5 is a flow diagram illustrating another embodiment of a method for updating attributes associated with data gathered from marine seismic surveys, according to some embodiments.

Alternatively, an embodiment of a method for updating attributes associated with post-migration data is depicted in the flow diagram of FIG. 5. It is contemplated that FIG. 5 illustrates another embodiment of a means for estimating one or more attributes of recorded marine seismic survey data. In various embodiments, the embodiment of the method illustrated in FIG. 5 may correspond to block 204 of the flow diagram of FIG. 2.

The method begins in block 501. One or more attributes of a post-migration version of the recorded marine seismic survey data may then be corrected without re-migrating the recorded marine seismic survey data (block 502). As with the method described in FIG. 4, the attributes may be corrected based on angle information derived from the post-migration seismic data. It is noted that the post-migration version of the recorded marine seismic survey data may be generated by a shot-by-shot migration of a pre-migration version of the recorded marine seismic survey data as described above. The method may then conclude in block 503.

It is noted that the embodiments described in the flow diagrams of FIG. 4 and FIG. 5 are merely examples, and that other operations and arrangements of operations may be employed. In the embodiment described above, either attributes of the pre-migration version of the recorded marine seismic survey data or attributes of the post-migration version of the recorded marine seismic survey data are updated. In other embodiments, any suitable combination of attributes from both pre-migration and post-migration versions of the recorded marine seismic survey data may be updated.

In some cases, it may be desirable to combine multiple distinct sets of survey data in various ways. For example, a large region may be surveyed by conducting a number of surveys over smaller segments of the region and then combining the smaller surveys. Alternatively, a set of time-lapse seismic images (commonly referred to as "4D images") of a single region may be generated using sets of seismic survey data from surveys performed at different times (e.g., to assess how sub-surface structures or reservoirs in the region change over time). When creating a composite 3D or 4D survey, since the particular seismic data sets used to generate the individual images were generated at different times, changes in survey geometries, ambient noise, environmental conditions, and the like, may result in artifacts between the seismic data sets. In order to use seismic data from different surveys, such artifacts should be attenuated, while preserving differences in the data related to potential reservoir or sub-surface structure alteration.

Figure 6:
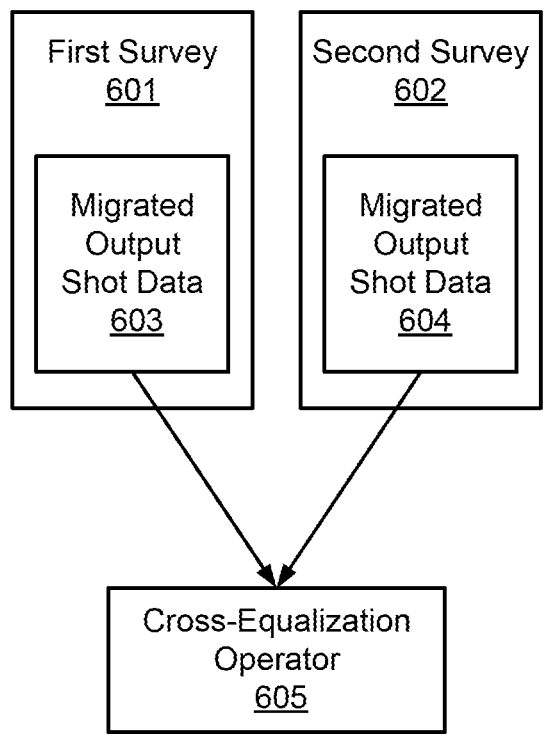
FIG. 6 is a diagram illustrating a relationship between data gathered from different marine seismic surveys and a cross-equalization operator, according to some embodiments.

To generate such composite 3D or 4D images, marine seismic data from multiple surveys may be used to generate a cross-equalization operator. As discussed in greater detail below, the cross-equalization operator may be applied to the seismic data in order to reduce the differences that may be present between two (or more) sets of seismic data owing, e.g., to different conditions at the different times and/or in the different areas where the seismic data was collected. A diagram depicting the generation of a cross-equalization operator is illustrated in FIG. 6. It is contemplated that FIG. 6 and its associated description below denote one embodiment of a means for generating one or more cross-equalization operators that reduce differences among a plurality of surveys with respect to one or more survey attributes. In the illustrated embodiment, first survey 601 and second survey 602 may be performed in different areas of a survey region, or (in the 4D case) over the same region at different times.

Migrated output shot data 603 associated with first survey 601, and migrated output shot data 604 associated with second survey 602 may be used to generate cross-equalization operator 605. As described above, migrated output shot data 603 and 604 may be generated using a method similar the method depicted in the flow diagram of FIG. 3. To generate cross-equalization operator 605, differences between migrated output shot data 603 and migrated output shot data 604 may be identified and minimized using any suitable optimization technique. In some embodiments, cross-equalization operator 605 may be computed using cross-correlation and auto-correlation deconvolution. For example, a Wiener filter may be derived between the cross-correlation of migrated output shot data 603 and migrated output shot data 604, and the auto-correlation of migrated output shot data 604 and itself. Such differences may include, difference in tidal statics, cable depth variation, water velocity variation, and the like. It is noted that cross-equalization operator 605 may be a complex data structure, such as a multidimensional matrix of values. Moreover, as used herein, "minimized" refers to a goal-seeking process that attempts to reduce differences between the inputs to a minimization process. It is not required or guaranteed that the minimization process identify a global or absolute minimum within a solution space. As described below in more detail, cross-equalization operator 605 may be used in the generation of images resulting from the use of multiple sets of survey data, such as composite 3D images or 4D images.

The embodiment depicted in FIG. 6 is merely an example, and although only two surveys are depicted in the embodiment of FIG. 6, in other embodiments, any suitable number of surveys may be employed.

Figure 7:
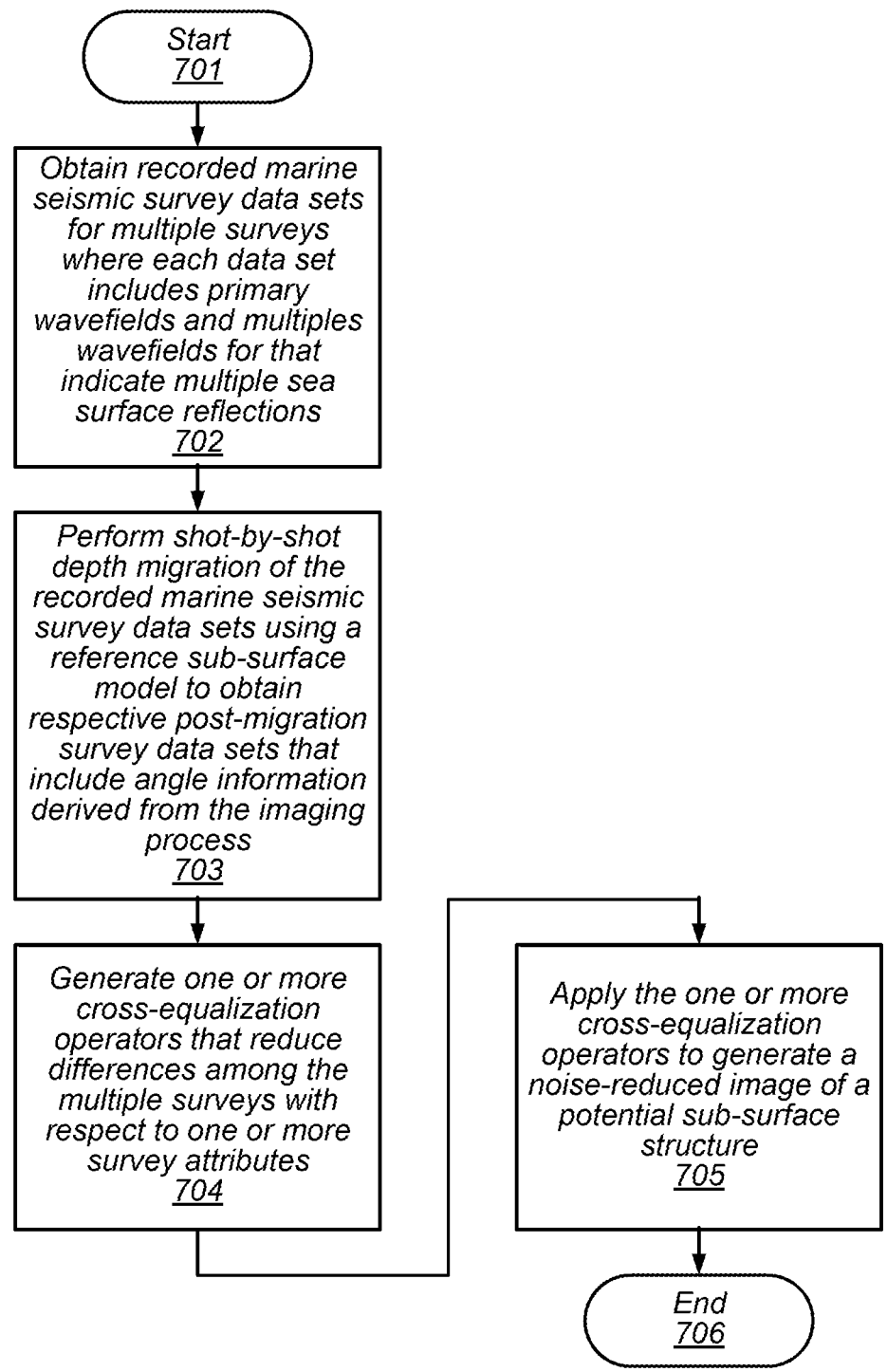
FIG. 7 is a flow diagram illustrating an embodiment of a method for the generation of output images using cross-equalization operators, according to some embodiments.

Once a cross-equalization operator has been generated, the data from the different marine seismic surveys may be used to generate a composite 3D or 4D image. A flow diagram depicting an embodiment of a method for generating a noise-reduced image of a potential sub-surface structure is illustrated in FIG. 7.

Recorded marine seismic survey data sets for multiple surveys may be obtained (block 702). Each data set may include primary wavefields and multiples wavefields that indicate multiple sea surface reflections may be used for imaging. The data sets may include multiple vintages of a 4D time-lapse survey of a given region, or partially overlapping 3D surveys.

A shot-by-shot depth migration of the recorded marine seismic survey data sets may then be performed using a reference sub-surface model to obtain post-migration survey data that includes angle information derived from the imaging process (block 703). Such angle information may be recovered in the migration of primaries and multiples during the imaging process. In some embodiments, performing the shot-by-shot depth migration of a given recorded marine seismic survey data set includes generating a primaries-only post-migration data set in addition to the post-migration data set. Generating the primaries-only post-migration data set may be dependent on only the primary wavefields of the given recorded marine seismic survey data set.

One or more cross-equalization operators may then be generated (block 704). The one or more cross-equalization operators may reduce differences among the various surveys with respect to one or more survey attributes. In some embodiments, generating the one or more cross-equalization operators includes generating a plurality of cross-equalization operators corresponding respectively to the plurality of surveys. The survey attributes may include time shift or differential curvature attributes. The survey attributes may include, in other embodiments, one or more of tidal statics, shot statics, cable depth variation, source signature variation, or water velocity variation. The one or more cross-equalization operators may be applied to generate a noise-reduced image of a potential sub-surface structure (block 705). In various embodiments, the one or more cross-equalization parameters may be applied to a particular survey data set prior to performing the shot-by-shot migration. In other cases, a respective cross-equalization operator may be applied to each survey data set. Survey data from the application of the cross-equalization operators may then be migrated to form the noise-reduced 3D or 4D image output.

It is noted that the embodiment of the method depicted in FIG. 7 is merely an example. In other embodiments, different operations and different orders of operations are possible and contemplated.

Figure 8:
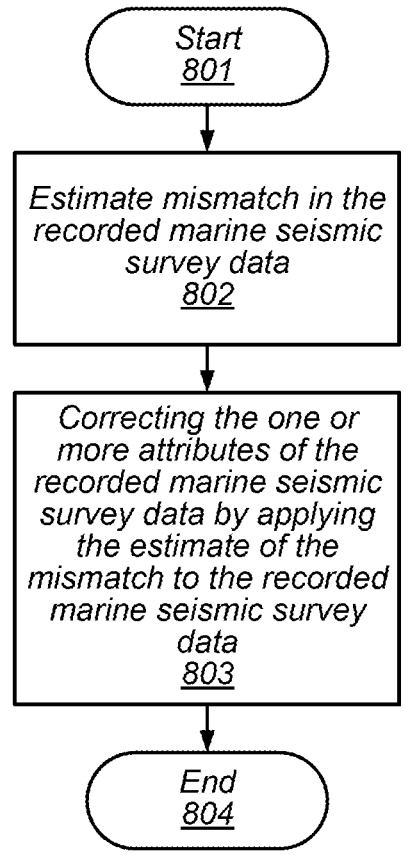
FIG. 8 is a flow diagram illustrating an embodiment of a method for updating attributes associated with data gathered from marine seismic surveys, according to some embodiments.

As described above, attributes associated with marine seismic survey data may be updated as part of a process for identifying potential sub-surface structure. An embodiment of a method for updating such attributes is depicted in the flow diagram of FIG. 8. It is contemplated that FIG. 8 illustrates another embodiment of a means for estimating one or more attributes of recorded marine seismic survey data, and in particular, a means for estimating and correcting for mismatch. In various embodiments, the embodiment of FIG. 8 may be included as part of block 204 of FIG. 2. The method begins in block 801.

Mismatch in the recorded marine seismic survey data may then be estimated (block 802). As used and described herein, a static references to a particular physical characteristic of a particular sailline included in a marine seismic survey. For example, in some embodiments, the mismatch for a particular marine seismic survey may include a tidal mismatch. For a given shot of a particular marine seismic survey, the mismatch may be estimated along a sailline, i.e., a line that a particular set of sensors follows during the survey.

The one or more attributes of the recorded marine seismic survey data may be corrected by applying the estimate of the mismatch to the recorded marine seismic survey data (block 803). A mismatch may be used to minimize differences in the data along the sailline resulting from changes in the value. Once the seismic data has been updated, the method may then conclude in block 804.

It is noted that the embodiment of the method depicted in the flow diagram of FIG. 8 is merely an example. In other embodiments, different operations and different orders of operations may be employed.

Figure 9:
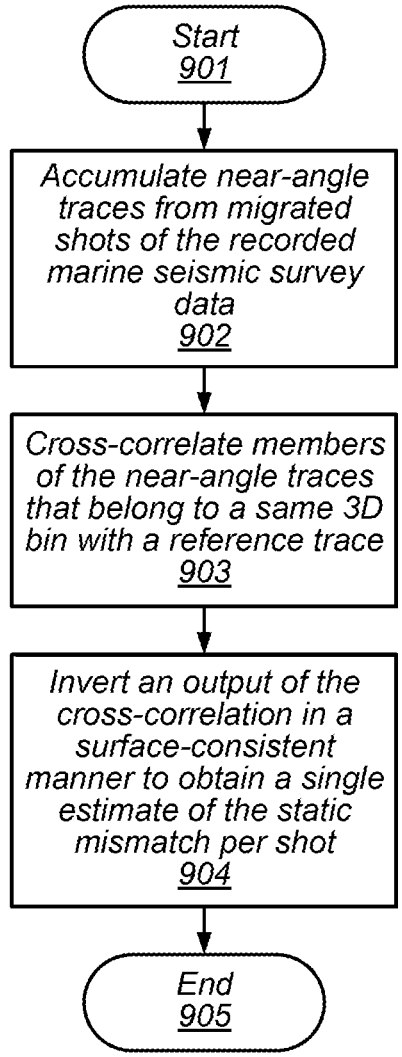
FIG. 9 is a flow diagram illustrating an embodiment of a method for obtaining an estimate of a mismatch associated with data gathered from marine seismic surveys, according to some embodiments.

Various methods may be employed to estimate values for the mismatches to allow for an estimation of mismatch described above. An embodiment of a method for estimating static values is illustrated in the flow diagram of FIG. 9. It is contemplated that FIG. 9 illustrates one embodiment of a means for generating an estimate of mismatch. In some embodiments, the method illustrated in the flow diagram of FIG. 9 may be included in block 802 of the embodiment depicted in FIG. 8. The method begins in block 901.

Near-angle traces from migrated shots of the recorded marine seismic survey data may then be accumulated (block 902). As described above, once the recorded marine seismic survey data has been migrated to an angle domain, it may depend on angles in a spherical coordinate system. It is noted, however, that other near-angle data may be accumulated from data represented in a domain other than an angle domain, such as a near-offset domain, for example.

Members of the near-angle traces that belong to a same 3D bin may then be cross-correlated with a reference trace (block 903). As used and described here a 3D bin refers to a portion of the area of a marine seismic survey. In various embodiments, traces may be assigned to a 3D bin based on a distance between a source and receiver, or any other suitable metric. In the present embodiment, near-angle data within a particular bin may be compared as part of the cross correlation with a reference trace.

An output of the cross correlation may then be inverted in a surface-consistent manner to obtain a single estimate for the static mismatch per shot (block 904). The method may then conclude in block 905. It is noted that the embodiment depicted in the flow diagram of FIG. 9 is merely an example. In other embodiments, different types of angle data may be utilized.

Figure 10:
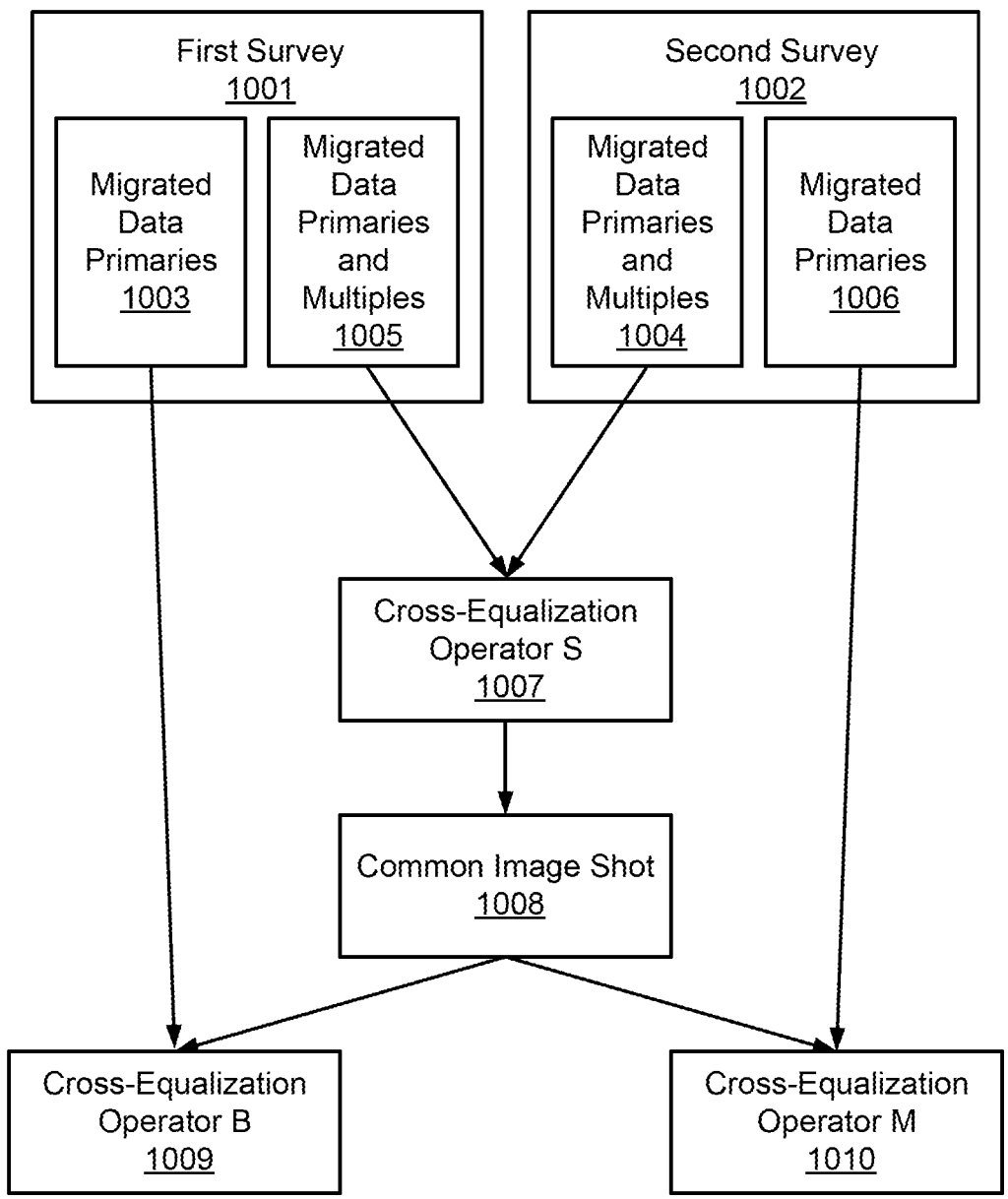
FIG. 10 is a diagram illustrating a relationship between data gathered from marine seismic surveys and multiple cross-equalization parameters, according to some embodiments.

In some cases, data corresponding to both primaries and multiples may be used to generate numerous cross-equalization operators that may be employed to generate composite 3D or 4D images. A diagram depicting the generation of cross-equalization operators is illustrated in FIG. 10. In the illustrated embodiment, first survey 1001 and second survey 1002 may be performed at different periods of reservoir production or in different regions.

Migrated data primaries and multiples 1005 and migrated data primaries and multiples 1004 may be used to generate cross-equalization operator S (block 1007). As described above, migrated data primaries and multiples 1005 and 1004 may be generated using a method similar to the method depicted in the flow diagram of FIG. 3. To generate cross-equalization operator S, differences between migrated data primaries and multiples 1005 and 1004 may be identified and minimized, using techniques similar to those discussed above with respect to FIG. 6. Such differences may include, difference in tidal statics, cable depth variation, water velocity variation, and the like. Cross-equalization operator S is then used to generate common image shot 1008.

Migrated data primaries 1003 associated with first survey 1001, and common image shot 1008 are then used to generate cross-equalization operation B (block 1009). As described above, cross-equalization operator B may be based upon differences, such as, e.g., tidal statics, between migrated data primaries 1003 and common image shot 1008. In a similar fashion, migrated data primaries 1006 associated with second survey 1002, and common image shot 1008 may be used to generate cross-equalization operator M (block 1010). In various embodiments, migrated data primaries 1003 and 1006 may be generated from marine seismic survey data included in first survey 1001 and second survey 1002, respectively, using a method similar to the method depicted in the flow diagram of FIG. 3, or any other suitable method.

It is noted that the embodiment in FIG. 10 is merely an example, and although two surveys are depicted, in other embodiments, any suitable number of surveys, and/or cross-equalization operators may be employed.

Figure 11:
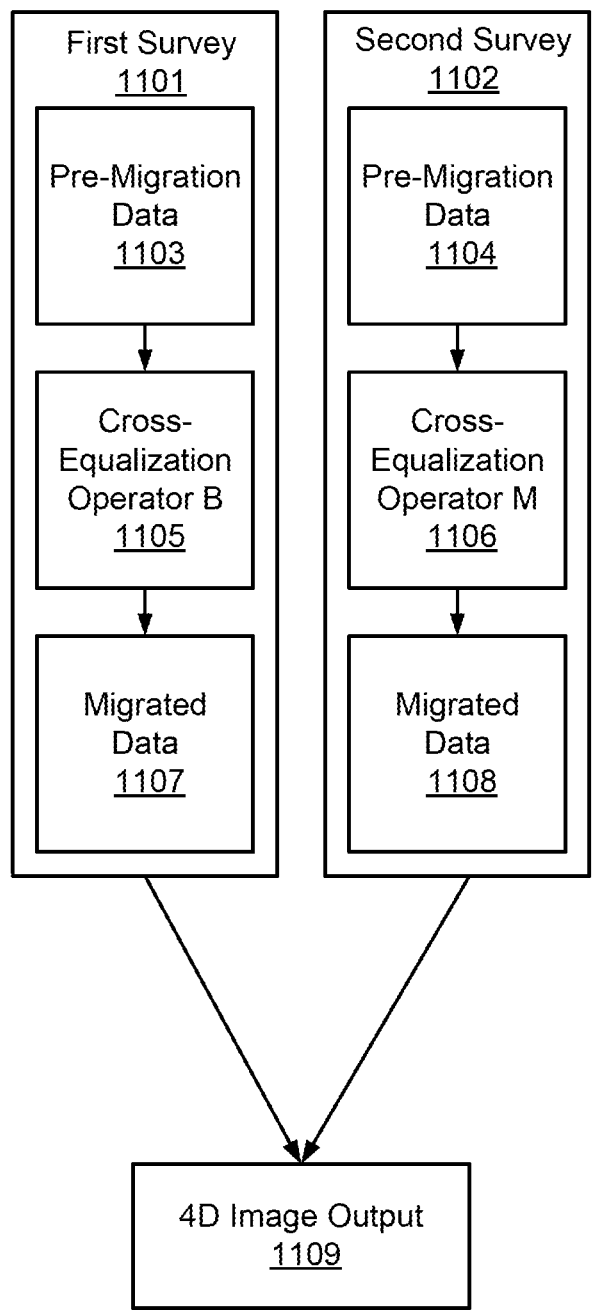
FIG. 11 is a diagram illustrating the generation of 4D images using multiple cross-equalization parameters, according to some embodiments.

Multiple cross-equalization operators, such as those described above in regard to FIG. 10, may be used in the generation of composite 3D or 4D images from marine seismic survey data. A diagram illustrating the use of multiple cross-equalization operators to generate such images is depicted in FIG. 11. As with the embodiment depicted in FIG. 10, the two illustrated surveys, first survey 1101 and second survey 1102, may be performed at different times or in different regions. In various embodiments, first survey 1101 may correspond to first survey 1001, and the second survey 1102 may correspond to second survey 1002.

To apply the correction, pre-migration data 1103 associated with first survey 1101 may be migrated, or cross-equalization operator B (block 1105) may be first applied to pre-migration data 1103. It is noted that in various embodiments, cross-equalization operator B may correspond to cross-equalization operator B as depicted in the embodiment of FIG. 10 at 1009. Resultant data generated by cross-equalization operator B may then be migrated to generate migrated data 1107. In various embodiments, the migration of the data generated by cross-equalization operator B may employ a method similar to the method depicted in the flow diagram of FIG. 3, or any other suitable migration method.

In a similar fashion, cross-equalization operator M (block 1106) is applied to pre-migration data 1104 associated with second survey 1102. Data resulting from the application of cross-equalization operator M may then be migrated to generate migrated data 1108. As described above, the migration of the data generated by cross-equalization operator M may employ a method similar to the method depicted in the flow diagram of FIG. 3.

With differences between pre-migration data 1103 and pre-migration data 1104 minimized using cross-equalization operator B (1105) and cross-equalization operator M (1106), migrated data 1107 and migrated data 1108 may be used to generate 4D image output 1109. In various embodiments, difference in migrated data 1107 and migrated data 1108 may be used to generate 4D image output 1109. By employing multiple cross-equalization operators, differences in pre-migration data 1103 and pre-migration data 1104 resulting from differences in conditions of first survey 1101 and second survey 1102 may be minimized, allowing changes in potential sub-surface structures, or other features of interest, from one survey to the other to be highlighted.

It is noted that the embodiment of FIG. 11 is merely an example and, in other embodiments, different numbers of surveys and different numbers of cross-equalization operators may be employed.

Thus far, discussion has focused on using various techniques discussed above to modify attributes of collected seismic data in view of a model, such as a water velocity model. This may enable the removal or reduction of noise or systematic error in the collected seismic data (e.g., noise or error that applies at many different points throughout the data, commonly due to a source of noise or error that affects the survey environment at a large scale). However, once systematic, global, or large-scale noise or error has been filtered from the seismic data, the remaining data may contain useful information about sub-surface structure or properties that is more comprehensive or detailed than the information represented by the model. For example, a simple model may not represent variations in sub-surface structure that nevertheless are reflected in the actual seismic data. Accordingly, in some cases, it may be useful to modify the model in view of the collected seismic data, in order to further refine the model's ability to represent the sub-surface properties it is modeling. For example, one or more of the operations described in the embodiment described in FIG. 2 may be employed in an iterative fashion to further assist in identifying possible sub-surface structures by updating the model in view of the data, rather than the reverse as was discussed above. An embodiment of such an iterative method is illustrated in the flow diagram of FIG. 12. The method begins in block 1201.

Recorded marine seismic survey data that includes primary wavefields and multiples wavefields that indicate multiple sea surface reflections may then be obtained (block 1202). In various embodiments, the marine seismic survey data may include multiple shots and may be gathered at different times using acoustic energy sources and sensors. Once the data has been gathered, it may be recorded or stored on one or more storage devices included in a computing system. Prior to proceeding, noise may be removed from the data, for example by applying techniques similar to those discussed above with respect to FIG. 2 and its related flow diagrams.

An initial shot-by-shot migration of the recorded marine seismic survey data may then be performed using a reference sub-surface model to obtain post-migration survey data that includes angle information derived from the primary wavefields and the multiples wavefields (block 1203). In various embodiments, the reference sub-surface model may include a reference velocity model, or any other suitable model parameters. In some cases, the migration may be performed using a method similar to the embodiment described in FIG. 3.

Several operations may be then performed iteratively to generate a global updated model dependent on the angle information. The operations may be performed until a termination criterion is satisfied. As part of the iterative operations, the global updated model may be generated dependent upon an analysis of the post-migration survey data (block 1204). The global model may, in various embodiments, include global water velocity, or any other suitable model parameter.

The recorded marine seismic survey data may then be re-migrated using the global updated model (block 1205). In various embodiments, the migration may include both primaries and multiples, and may be performed using a method similar to the embodiment described in the flow diagram of FIG. 3.

One or more termination criteria may then be checked (block 1206). The convergence criteria may, in various embodiments, include a difference of one or more parameters included in the global updated model, or differences between the data migrated at two consecutive iterations, or any other suitable criteria, or combination thereof. In some cases, the termination criteria may include a comparison of a total number of iterations to a threshold number of iterations. The method may then depend on whether the one or more termination criteria were met (block 1207).

If the termination criteria have not been met, the method may proceed from block 1204 as described above. Alternatively, if the termination criteria have been met, then a potential sub-surface structure may be identified using the global updated model to process the recorded marine seismic survey data (block 1208). In various cases, sub-surface structures may include particular geological structure that may indicate the presence of hydrocarbons, or features that may be hazardous when attempting to position a drilling rig, and the like. The method may then conclude in block 1209.

Figure 12:
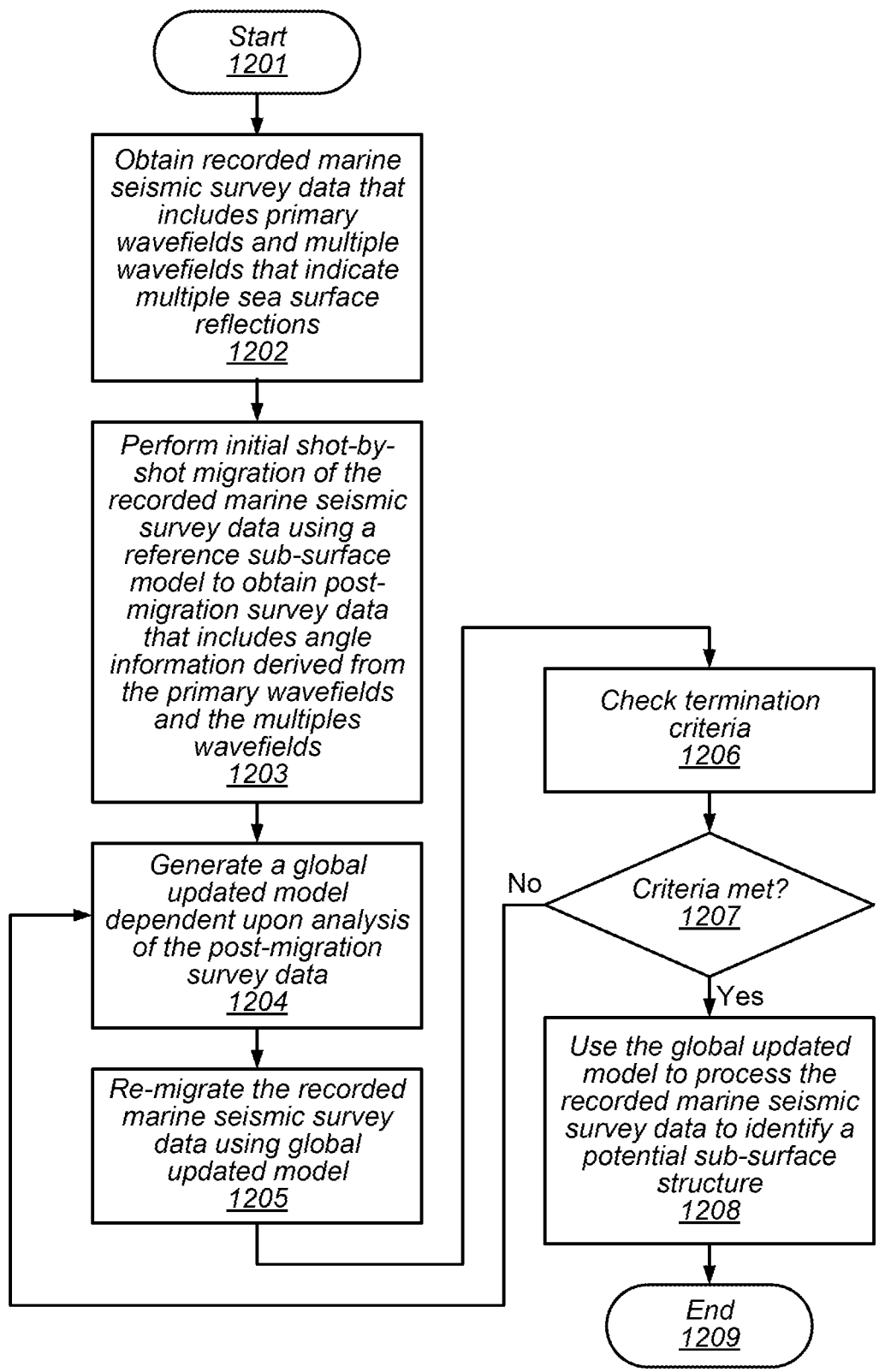
FIG. 12 is a flow diagram illustrating an embodiment of a method for iteratively updating a sub-surface model using to identify possible sub-surface structures based on data gathered from marine seismic surveys, according to some embodiments.

It is noted that the embodiment of the method depicted in FIG. 12 is merely an example. In other embodiments, different operations and different orders of operations may be employed.

When employing an iterative method, the global model may be generated and updated using both migrated primaries data from which multiples have been removed, as well as migrated data that includes both primaries and multiples. An embodiment of an iterative method that updates the global model using migrated primaries data, in addition to migrated primaries and multiples data, is depicted in the flow diagram of FIG. 13. The method begins in block 1301.

Recorded marine seismic survey data may then be obtained (block 1302). In various embodiments, the marine seismic survey data may include multiple shots and may be gathered at different times using acoustic energy sources and sensors. The data may include information indicative of a primary wavefield along with one or more multiples wavefields.

As described above in regard to the embodiment of FIG. 12, an initial shot-by-shot migration of the recorded marine seismic survey data using a reference model to obtain post-migration survey data that includes angle information derived from the primary and multiples wavefields may then be performed (block 1303). Additionally, a data demultiple procedure may be performed on the recorded seismic survey data to extract the primary wavefields (block 1304). A shot-by-shot depth migration may be performed, separately from the migration of block 1303, on only the primary wavefields to obtain primary-only post-migration survey data (block 1305). In each case, the shot-by-shot migration may be performed using a method similar to the embodiment depicted in the flow diagram of FIG. 3.

Several operations may be then performed iteratively to generate a global updated model dependent on the angle information. The operations may be performed until a termination criterion is satisfied. As part of the iterative operations, the global updated model may then be generated dependent upon both the post-migration survey data and the primary-only post-migration data (block 1306). The global updated model may be used when migrating any given shot included in the marine seismic survey data. The global model may, in various embodiments, include a global water velocity, or any other suitable model parameter.

The recorded marine seismic survey data (both the original data and the primary-only data) may then be re-migrated using the global updated model (block 1307). Such data migration may be performed using a method similar to the embodiment described in the flow diagram of FIG. 3.

One or more termination criteria may then be checked (block 1308). The termination criteria may, in various embodiments, include a difference of one or more parameters included in the global updated model, or differences between the sets of data migrated at two consecutive iterations, or any other suitable criteria, or combination thereof. In some cases, the termination criteria may include a comparison of a total number of iterations to a threshold number of iterations. Termination of the method may then depend on whether the one or more termination criteria were met (block 1309).

If the termination criteria have not been met, the method may proceed from block 1306 as described above. Alternatively, if the termination criteria have been met, then a potential sub-surface structure may be identified using the global updated model to process the recorded seismic survey data (block 1310). In various cases, sub-surface structures may include particular geological structure that may indicate the presence of hydrocarbons, or features that may be hazardous when attempting to position a drilling rig, and the like. The method may then conclude in block 1311.

Figure 13:
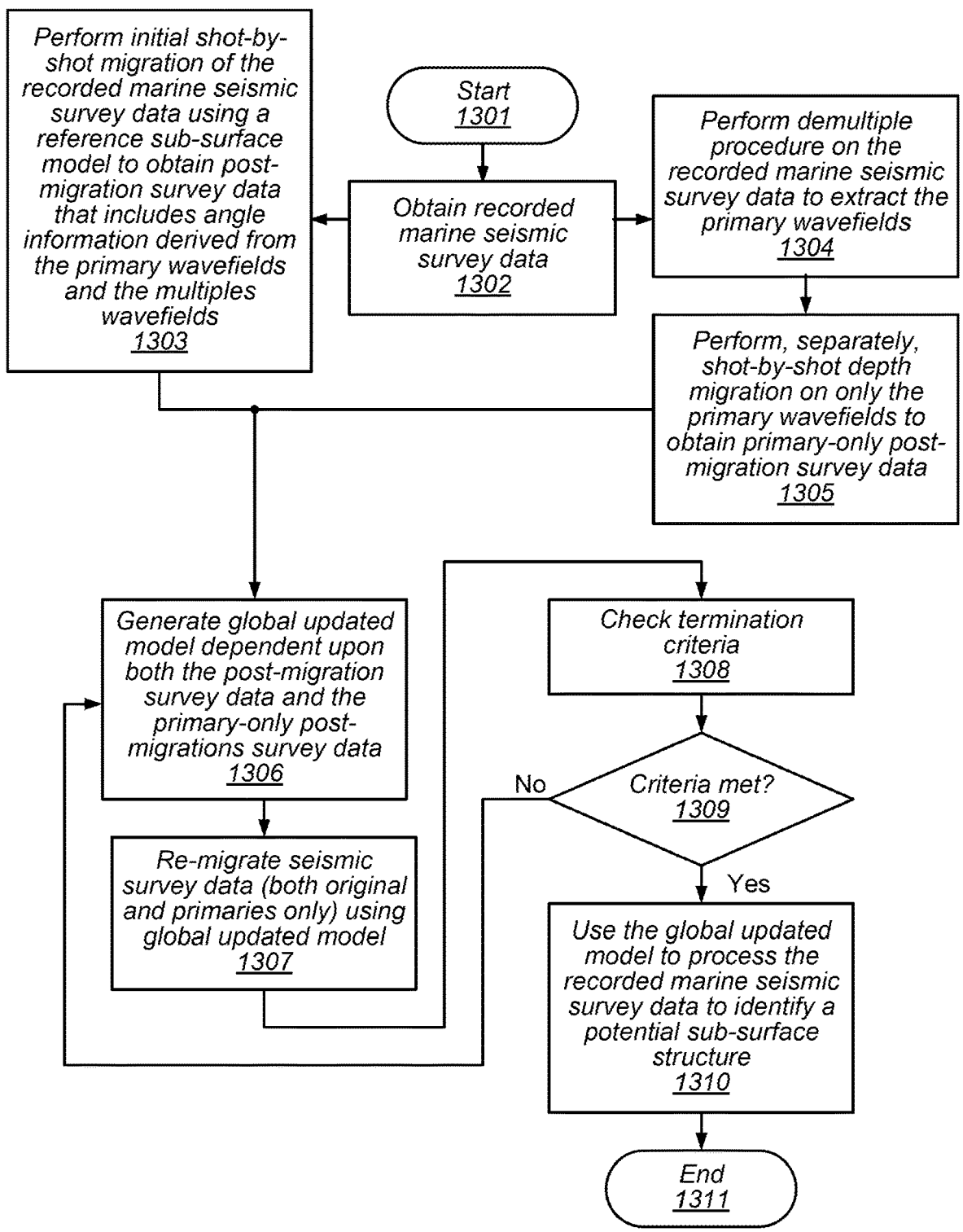
FIG. 13 is a flow diagram illustrating another embodiment of a method for iteratively updating a sub-surface model using to identify possible sub-surface structures based on data gathered from marine seismic surveys, according to some embodiments.

It is noted that the embodiment depicted in the flow diagram of FIG. 13 is merely an example. In other embodiments, different operations and different orders of operations are possible and contemplated.

Figure 14:
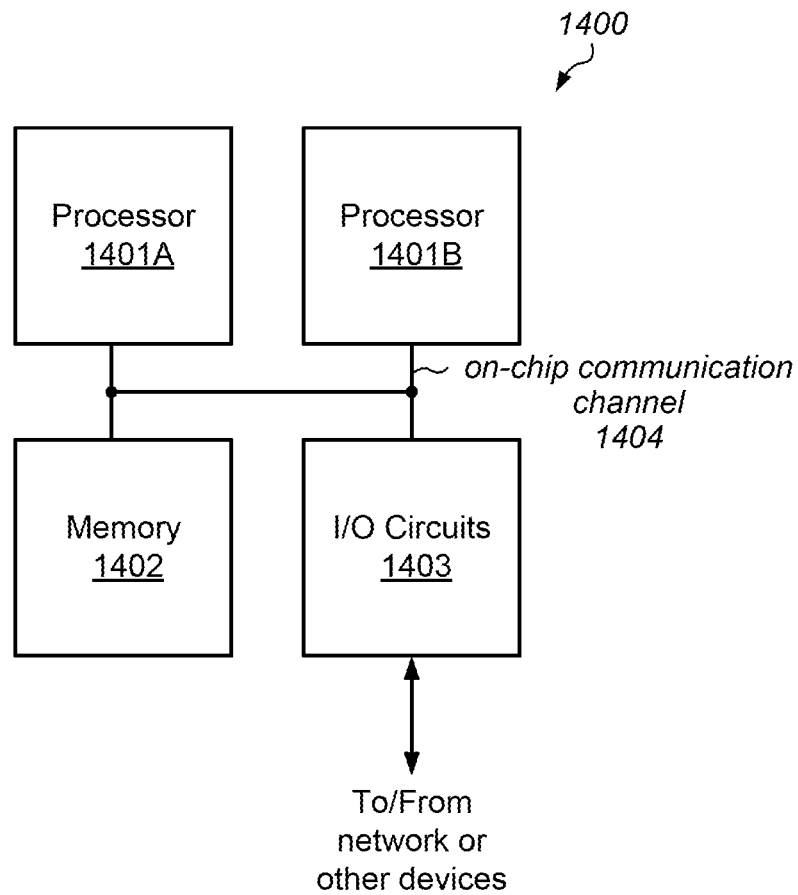
FIG. 14 is a block diagram of an integrated circuit, according to some embodiments.

A block diagram of an integrated circuit configured to execute program instructions for analyzing seismic survey data is illustrated in FIG. 14. In the illustrated embodiment, the integrated circuit 1400 includes a processor 1401A and processor 1401B, coupled to memory 1402, and I/O circuits 1403 via on-chip communication channel 1404. In various embodiments, integrated circuit 1400 may be configured for use in a desktop computer, server, or in a mobile computing application such as, e.g., a tablet or laptop computer.

Processors 1401A and 1401B may, in various embodiments, be representative of a general-purpose processor that performs computational operations. For example, processors 1401A and 1401B may be a central processing unit (CPU) such as a microprocessor, a microcontroller, an application-specific integrated circuit (ASIC), or a field-programmable gate array (FPGA). In some embodiments, processors 1401A and 1401B may execute program instructions, which may be stored in memory 1402 to perform various computational tasks, such as any of the techniques described above in regard to analyzing seismic survey data.

Memory 1402 may include any suitable type of memory such as a Dynamic Random Access Memory (DRAM), a Static Random Access Memory (SRAM), a Read-only Memory (ROM), Electrically Erasable Programmable Read-only Memory (EEPROM), or a FLASH memory, for example. It is noted that in the embodiment of an integrated circuit illustrated in FIG. 14, a single memory is depicted. In other embodiments, any suitable number of memories may be employed.

I/O circuits 1403 may be configured to coordinate data transfer between integrated circuit 1400 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O circuits 1403 may be configured to implement a version of Universal Serial Bus (USB) protocol or IEEE 1394 (Firewire™) protocol.

I/O circuits 1403 may also be configured to coordinate data transfer between integrated circuit 1400 and one or more devices (e.g., other computer systems or integrated circuits) coupled to integrated circuit 1400 via a network. In one embodiment, I/O circuits 1403 may be configured to perform the operations necessary to implement an Ethernet (IEEE 802.3) networking standard such as Gigabit Ethernet or 10-Gigabit Ethernet, for example, although it is contemplated that any suitable networking standard may be implemented. In some embodiments, I/O circuits 1403 may be configured to implement multiple discrete network interface ports.

It is noted that the embodiment depicted in FIG. 14 is merely an example. In other embodiments, different functional blocks and different configurations of functional blocks are possible and contemplated.

Figure 15:
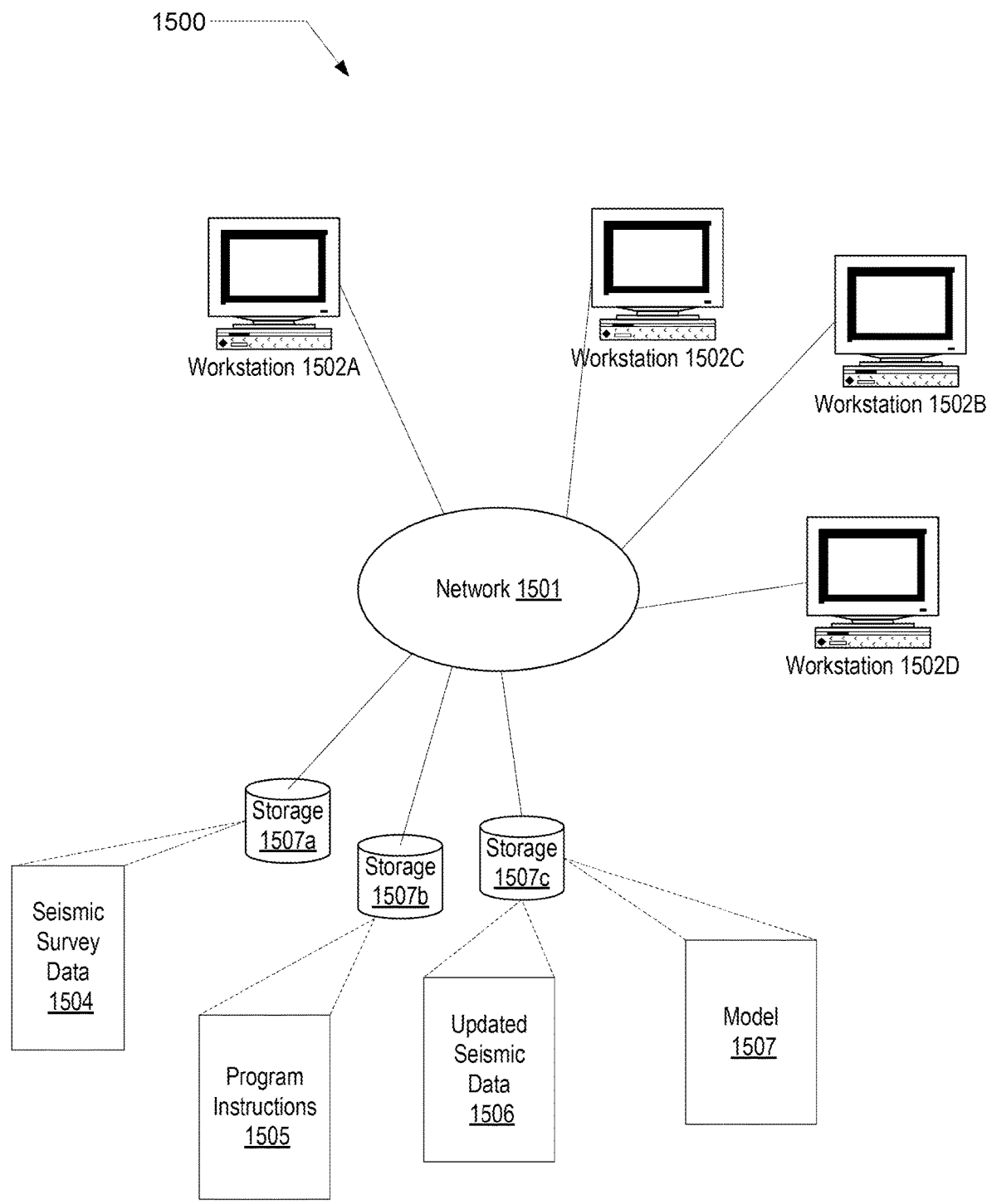
FIG. 15 is a block diagram illustrating an embodiment of a computing system, according to some embodiments.

Turning to FIG. 15, a block diagram of one embodiment of a computer system for analyzing seismic survey data is illustrated. The computer system 1500 includes multiple workstations designated 1502A through 1502D. The workstations are coupled together through a network 1501 and to multiple storage devices designated 1507A through 1507C. In one embodiment, a given one of workstations 1502A-1502D may be representative of any standalone computing platform that may include, for example, one or more processors, local system memory including any type of random access memory (RAM) device, monitor, input output (I/O) means such as a network connection, mouse, keyboard, and the like (many of which are not shown for simplicity).

In one embodiment, storage devices 1507A-1507C may be representative of any type of non-transitory computer-accessible storage medium such as hard disk systems, optical media drives, tape drives, NVRAM disk storage, and the like. As such, program instructions included for processing seismic survey data may be stored within any of storage devices 1507a-1507c and loaded into the local system memory of any of the workstations during execution. As an example, as shown in FIG. 15, program instructions 1505 are shown stored within storage device 1507b.

In one embodiment, program instructions 1505 may be called by any of workstations 1502A-1502D. The program instructions may be executed directly from the storage device 1507b, or may be transferred to the local system memory in one of workstations 1502A-1502D for subsequent execution. In some cases, one or more processors included in a given workstation may execute program instructions 1505 may be distributed, or they may be executed in a distributed fashion among the workstations 1502A-D, as desired.

During execution of program instructions 1505, seismic survey data 1504 may be retrieved from storage device 1507a for analysis. As described above, seismic survey data 1504 may include data from one or more surveys, and may be processed or migrated to generate updated seismic data 1506, which may be stored on storage device 1507c. As part of the execution of program instructions 1505, sub-surface model 1507 may be generated and stored in storage device 1507c, for later retrieval and use.

It is noted that the embodiment depicted in FIG. 15 is merely an example In other embodiments, different numbers of workstations and storage devices may be employed, as well as different storage locations for seismic survey data 1504, program instructions 1505, updated seismic data 1506, and sub-surface model 1507.

In some embodiments, records of geophysical surveying, such as data collected by sensors or data that has been adjusted or transformed according to any of the techniques described above, may be embodied in a tangible, computer-readable medium to create a "geophysical data product." A geophysical data product may employ a computer-readable, non-transitory medium and embodies geophysical data (such as raw streamer data, processed streamer data, two- or three-dimensional maps based on streamer data, or other configurations of a data product). Some non-limiting examples of computer-readable media may include hard drives, CDs, DVDs, flash memory, print-outs, etc. In some embodiments, a geophysical data product may embody raw analog data from streamers. In other instances, the geophysical data product may embody data that is a digitized and/or conditioned version of analog data. In yet other instances, the embodied data may be fully processed into a two- or three-dimensional map of the various geophysical structures.

Techniques such as those described above may result in the generation of new geophysical data products. For example, in any of the methods described above, an additional operation of storing resulting geophysical data to a tangible, computer-readable medium may be either added to the method or incorporated as part of an existing operation (such as the generation, estimation, or correction of geophysical data). Non-limiting examples of geophysical data products shown in FIG. 15 include seismic survey data 1504, stored on storage device 1507a; updated seismic data 1506, stored on storage device 1507c; and sub-surface model 1507, also stored on storage device 1507c.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A technological process for reducing noise in marine seismic survey data, comprising:
   obtaining recorded marine seismic survey data comprising multiples wavefields, wherein the multiples wavefields indicate multiple sea surface reflections;
   performing shot-by-shot depth migration of the recorded marine seismic survey data using a sub-surface model to obtain post-migration common image gathers, wherein the post-migration common image gathers include angle information derived from the multiples wavefields;
   using the angle information, estimating one or more attributes of the recorded marine seismic survey data; and
   using the one or more attributes to generate a corrected version of the recorded marine seismic survey data.

2. The technological process of claim 1, wherein estimating the one or more attributes of the recorded marine seismic survey data comprises changing a pre-migration version of the recorded marine seismic survey data and re-migrating the changed pre-migration version.

3. The technological process of claim 1, wherein estimating the one or more attributes of the recorded marine seismic survey data comprises changing a post-migration version of the recorded marine seismic survey data without re-migrating the recorded marine seismic survey data.

4. The technological process of claim 1, wherein the one or more attributes include a sub-surface layer property, wherein the shot-by-shot depth migration is performed using a reference value of the sub-surface layer property, and wherein estimating the one or more attributes comprises performing shot-by-shot correction to correct for variations in the sub-surface layer property.

5. The technological process of claim 4, wherein the sub-surface layer property is a water layer property.

6. The technological process of claim 5, wherein the water layer property comprises one or more of: a water velocity, a tidal static, a shot static, a static or velocity variation along a sail line, or any combination thereof.

7. The technological process of claim 1, wherein the recorded marine seismic survey data comprises survey data obtained from different surveys, and wherein estimating the one or more attributes of the recorded marine seismic survey data comprises reducing mismatch of corresponding data points within the different surveys.

8. The technological process of claim 7, wherein the different surveys comprise multiple vintages of a 4D time-lapse survey of a given survey region.

9. The technological process of claim 7, wherein the different surveys comprise partially overlapping 3D surveys.

10. The technological process of claim 9, wherein the partially overlapping 3D surveys comprise multiple azimuth or wide azimuth surveys.

11. The technological process of claim 1, wherein the recorded marine seismic survey data further comprises primary wavefields, wherein the shot-by-shot depth migration is performed on the primary wavefields in addition to the multiples wavefields, and wherein the post-migration common image gathers include angle information derived from the primary wavefields and the multiples wavefields.

12. The technological process of claim 1, wherein the recorded marine seismic survey data includes records obtained from both pressure sensors and particle motion sensors.

13. The technological process of claim 1, wherein the recorded marine seismic survey data includes records obtained only from pressure sensors.

14. The technological process of claim 1, further comprising:
   subsequent to the estimating, iteratively updating the sub-surface model dependent upon the corrected version of the recorded marine seismic survey data until the updated sub-surface model satisfies a convergence criterion.

15. The technological process of claim 1, further comprising generating an estimate of a mismatch in the recorded marine seismic survey data, wherein correcting the one or more attributes of the recorded marine seismic survey data comprises applying the estimate of the mismatch to the recorded marine seismic survey data.

16. The technological process of claim 15, wherein generating the estimate of the mismatch comprises:
   accumulating near-angle traces from migrated shots of the recorded marine seismic survey data;
   cross-correlating members of the near-angle traces that belong to a same 3D bin; and
   inverting an output of the cross-correlating in a surface-consistent manner to obtain a single estimate of the mismatch per shot.

17. The technological process of claim 1, further comprising using the corrected version of the recorded marine seismic survey data to identify a potential sub-surface structure.

18. A method of manufacturing a geophysical data product, comprising:
   performing the technological process of claim 1; and
   storing the corrected version of the recorded marine seismic survey data in a tangible computer-readable storage medium, thereby creating the geophysical data product.

19. A non-transitory computer-readable storage medium that stores program instructions, wherein the program instructions are executable by one or more computers to perform operations comprising:
   obtaining recorded marine seismic survey data comprising primary wavefields and multiples wavefields, wherein the multiples wavefields indicate multiple sea surface reflections;
   performing an initial shot-by-shot depth migration of the recorded marine seismic survey data using a reference sub-surface model to obtain post-migration survey data, wherein the post-migration survey data includes angle information derived from the primary wavefields and the multiples wavefields;
   iteratively generating a global updated model dependent on the angle information; and
   using the global updated model to process the recorded marine seismic survey data to identify a potential sub-surface structure;
   wherein the iteratively generating comprises iteratively performing the following operations until a termination criterion is satisfied:
      generating the global updated model dependent upon analysis of the post-migration survey data; and
      re-migrating the recorded marine seismic survey data using the global updated model.

20. The non-transitory computer-readable storage medium of claim 19, wherein the reference sub-surface model is a reference velocity model, and wherein the global updated model is a global velocity model.

21. The non-transitory computer-readable storage medium of claim 19, wherein performing the initial shot-by-shot depth migration comprises:
performing a demultiple procedure on the recorded marine seismic survey data to extract the primary wavefields; and
separately performing shot-by-shot depth migration on only the primary wavefields to obtain primary-only post-migration survey data;
wherein the iteratively generating is dependent upon both the post-migration survey data and the primary-only post-migration survey data.

22. The non-transitory computer-readable storage medium of claim 19, wherein the iteratively generating further comprises separately re-migrating the primary wavefields using the global updated model.

23. A system, comprising:
one or more processors; and
a memory that stores instructions, wherein the instructions are executable by the one or more processors to perform operations comprising:
obtaining recorded marine seismic survey data sets for a plurality of surveys, wherein the data sets respectively include primary wavefields and multiples wavefields for a given one of the plurality of surveys, wherein the multiples wavefields indicate multiple sea surface reflections;
performing shot-by-shot depth migration of the recorded marine seismic survey data sets using a reference sub-surface model to obtain respective post-migration survey data sets, wherein the post-migration survey data sets include angle information derived from the primary wavefields and the multiples wavefields;
dependent on the post-migration survey data sets, generating one or more cross-equalization operators that reduce differences among the plurality of surveys with respect to one or more survey attributes; and
applying the one or more cross-equalization operators to generate a noise-reduced image of a potential sub-surface structure.

24. The system of claim 23, wherein the one or more survey attributes include time shift or differential curvature attributes.

25. The system of claim 23, wherein the one or more survey attributes include one or more of tidal statics, shot statics, cable depth variation, or water velocity variation.

26. The system of claim 23, wherein the plurality of surveys comprises multiple vintages of a 4D time-lapse survey of a given survey region.

27. The system of claim 23, wherein the plurality of surveys comprises partially overlapping 3D surveys.

28. The system of claim 23, wherein performing shot-by-shot depth migration of a given recorded marine seismic survey data set corresponding to a respective survey comprises generating a primaries-only post-migration survey data set in addition to the respective post-migration survey data sets, wherein generating the primaries-only post-migration survey data set is dependent on only the primary wavefields of the given recorded marine seismic survey data set.

29. The system of claim 28, wherein generating the one or more cross-equalization operators comprises generating a plurality of cross-equalization operators corresponding respectively to the plurality of surveys.

* * * * *